United States Patent
Ikezawa

(10) Patent No.: US 11,513,200 B2
(45) Date of Patent: Nov. 29, 2022

(54) DISTANCE MEASURING DEVICE AND DISTANCE MEASURING METHOD

(71) Applicant: SONY SEMICONDUCTOR SOLUTIONS CORPORATION, Kanagawa (JP)

(72) Inventor: Katsuya Ikezawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 577 days.

(21) Appl. No.: 16/481,356

(22) PCT Filed: Feb. 8, 2018

(86) PCT No.: PCT/JP2018/004286
§ 371 (c)(1),
(2) Date: Jul. 26, 2019

(87) PCT Pub. No.: WO2018/155194
PCT Pub. Date: Aug. 30, 2018

(65) Prior Publication Data
US 2019/0391237 A1  Dec. 26, 2019

(30) Foreign Application Priority Data

Feb. 21, 2017  (JP) .............................. JP2017-029834

(51) Int. Cl.
*G01S 7/00* (2006.01)
*G01S 7/487* (2006.01)
(Continued)

(52) U.S. Cl.
CPC ............ *G01S 7/487* (2013.01); *G01S 7/4863* (2013.01); *G01S 7/4865* (2013.01); *G01S 17/894* (2020.01)

(58) Field of Classification Search
USPC ....................................................... 356/5.01
See application file for complete search history.

(56) References Cited

U.S. PATENT DOCUMENTS 9,723,233 B2 * 8/2017 Grauer .............. H01L 27/14609
9,753,126 B2 * 9/2017 Smits ...................... G01S 17/10
(Continued)

FOREIGN PATENT DOCUMENTS

CN    105093206 A    11/2015
CN    106416228 A     2/2017
(Continued)

OTHER PUBLICATIONS

International Search Report and Written Opinion of PCT Application No. PCT/JP2018/004286, dated Apr. 24, 2018, 09 pages of ISRWO.

*Primary Examiner* — James R Hulka
(74) *Attorney, Agent, or Firm* — Chip Law Group

(57) ABSTRACT

The present technology relates to a distance measuring device and a distance measuring method that inhibit possible noise in a pixel signal based on reflected light from an object to allow accuracy of distance measurement to be maintained. A distance measuring device according to an aspect of the present technology includes a light emitting section emitting irradiation light, a light receiving section receiving reflected light corresponding to the irradiation light reflected at an object, a calculation section calculating a distance to the object on the basis of a time from emission of the irradiation light until reception of the reflected light, and a control section controlling emission of the irradiation light. The light receiving section includes a plurality of AD converting section AD-converting pixel signals read from the pixels. A first pixel signal and a second pixel signal respectively read from a first pixel and a second pixel of the plurality of pixels forming the light receiving section are AD-converted by an (Continued)

identical AD converting section of the plurality of AD converting sections, the first and second pixels being adjacent to each other. During a process of calculating the time, the calculation section calculates a difference between the first pixel signal and the second pixel signal AD-converted by the identical AD converting section.

5 Claims, 15 Drawing Sheets

(51) Int. Cl.
  *G01S 7/4863* (2020.01)
  *G01S 7/4865* (2020.01)
  *G01S 17/894* (2020.01)

(56) References Cited

U.S. PATENT DOCUMENTS

| | | | |
|---|---|---|---|
| 2004/0104873 A1* | 6/2004 | Kang | G09G 3/3688 |
| | | | 345/87 |
| 2010/0283413 A1* | 11/2010 | Richter | H04N 9/3129 |
| | | | 315/360 |
| 2012/0305752 A1* | 12/2012 | Shimizu | H04N 5/3765 |
| | | | 250/208.1 |
| 2013/0020471 A1 | 1/2013 | Korekado et al. | |
| 2013/0162973 A1 | 6/2013 | Kamiyama et al. | |
| 2014/0263969 A1* | 9/2014 | Mayer | H04N 5/37457 |
| | | | 250/208.1 |
| 2015/0187923 A1 | 7/2015 | Kawahito | |
| 2015/0331092 A1 | 11/2015 | Galera et al. | |
| 2016/0178749 A1* | 6/2016 | Lin | H04N 5/378 |
| | | | 348/302 |
| 2016/0181226 A1* | 6/2016 | Wan | H01L 27/14627 |
| | | | 257/432 |
| 2016/0182886 A1* | 6/2016 | Lin | G01S 17/36 |
| | | | 348/46 |
| 2016/0344965 A1* | 11/2016 | Grauer | H01L 27/14634 |
| 2017/0176575 A1* | 6/2017 | Smits | G01S 17/48 |
| 2017/0201702 A1 | 7/2017 | Niwa et al. | |
| 2017/0231500 A1* | 8/2017 | Rothberg | A61B 5/1455 |
| | | | 250/459.1 |

FOREIGN PATENT DOCUMENTS

| | | |
|---|---|---|
| DE | 112011101123 T5 | 1/2013 |
| EP | 2881991 A1 | 6/2015 |
| EP | 2947477 A2 | 11/2015 |
| JP | 2011-217206 A | 10/2011 |
| JP | 2013-134173 A | 7/2013 |
| JP | 2016-012903 A | 1/2016 |
| JP | 2016-012904 A | 1/2016 |
| JP | 2016-012905 A | 1/2016 |
| JP | 2016-090268 A | 5/2016 |
| KR | 10-2017-0016828 A | 2/2017 |
| TW | 201423965 A | 6/2014 |
| WO | 2011/122600 A1 | 10/2011 |
| WO | 2014/021417 A1 | 2/2014 |
| WO | 2015/186302 A1 | 12/2015 |

* cited by examiner

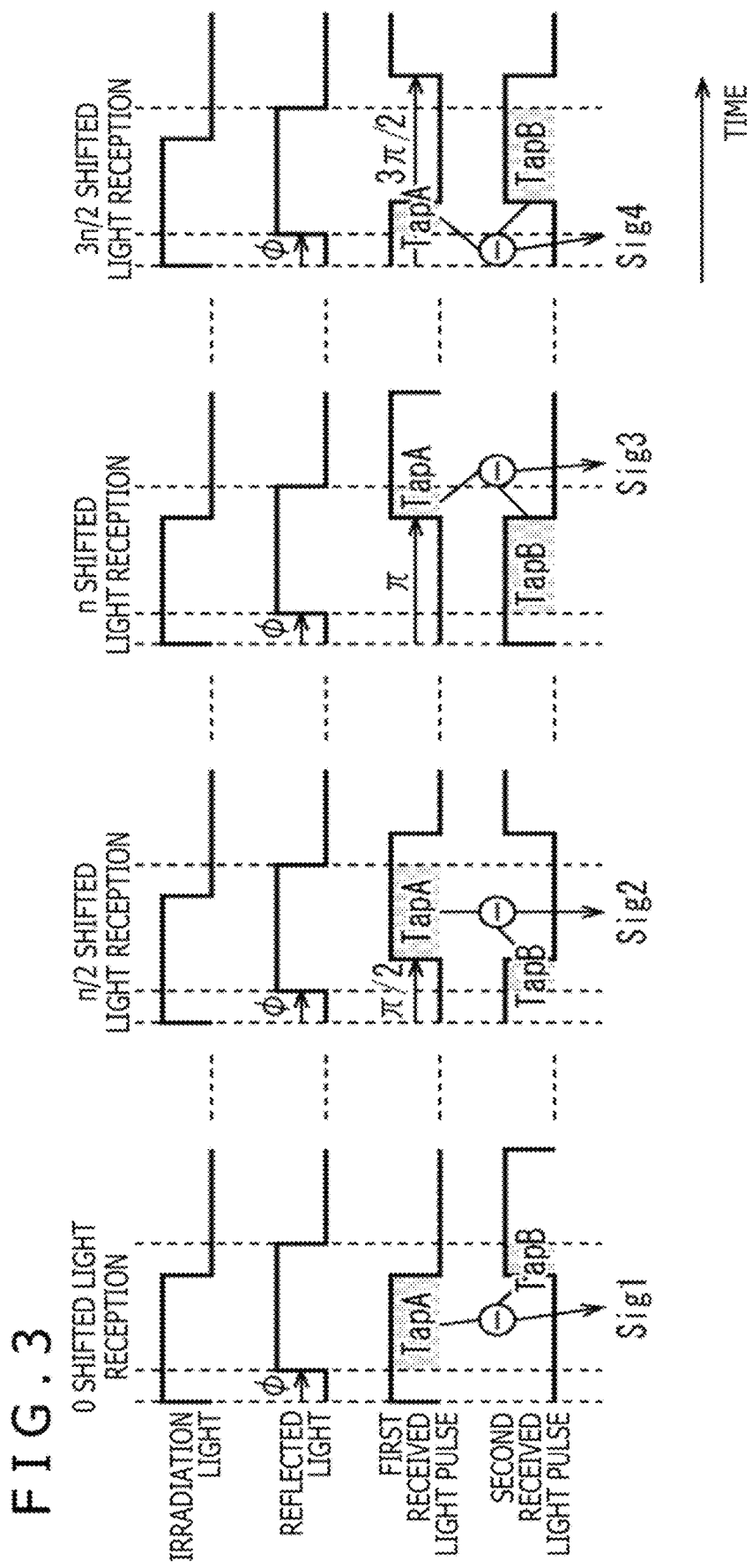

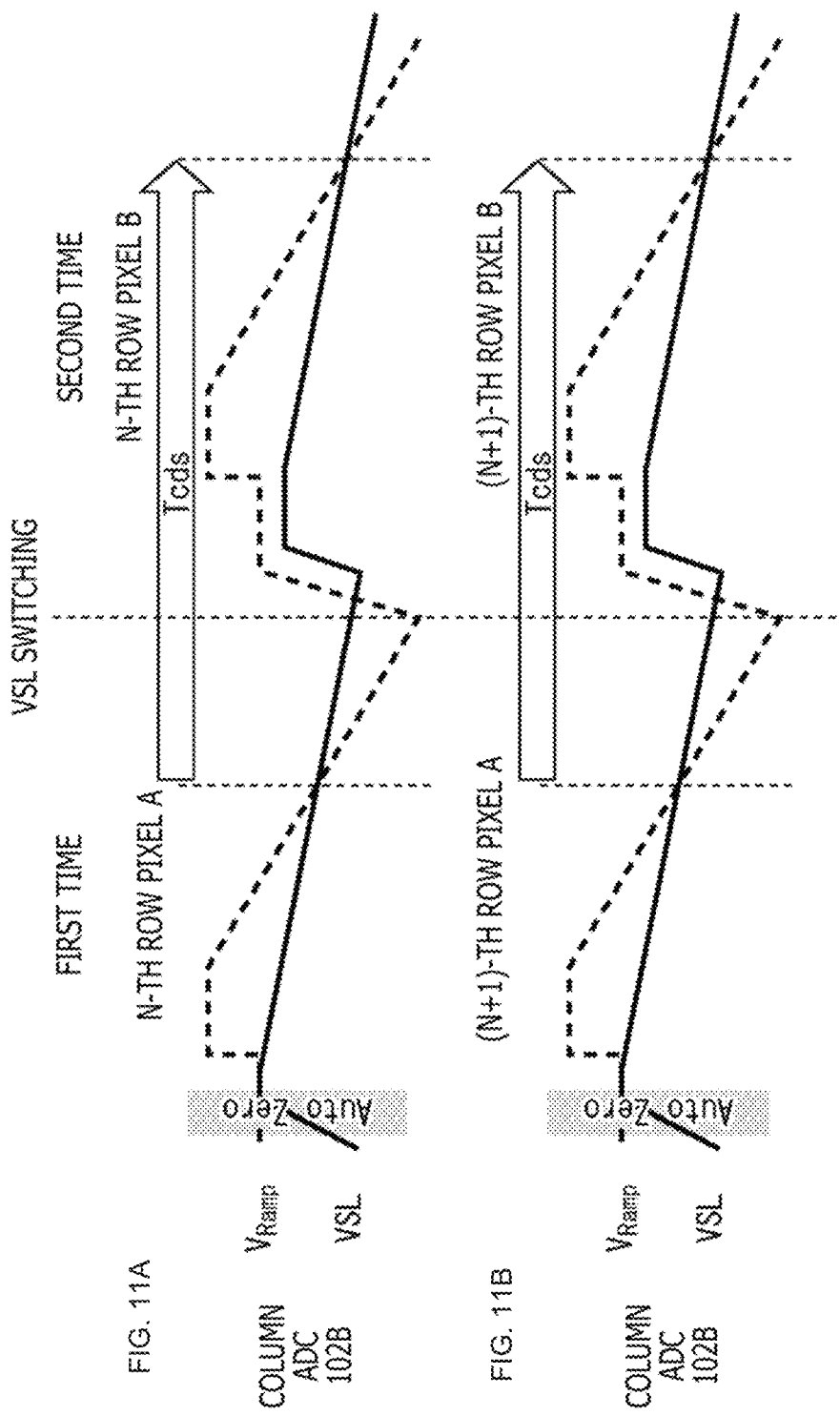

FIG. 12A

|  |  | unit |
|---|---|---|
| 1LSB/00dB | 850.44 | uV |
| CONVERSION EFFICIENCY | 8.70 | uV/e- |
| CM NOISE | 406.88 | uVrms |
| PIXEL | 681.96 | uVrms |
| QUANTIZATION NOISE | 245.50 | uVrms |
| Total NOISE | 831.20 | uVrms |
|  | 95.54 | e- rms |

FIG. 12B

|  |  | unit |
|---|---|---|
| 1LSB/00dB | 850.44 | uV |
| CONVERSION EFFICIENCY | 8.70 | uV/e- |
| CM NOISE | 216.67 | uVrms |
| PIXEL | 681.96 | uVrms |
| QUANTIZATION NOISE | 245.50 | uVrms |
| Total NOISE | 756.50 | uVrms |
|  | 86.95 | e- rms |

DISTANCE MEASURING DEVICE AND DISTANCE MEASURING METHOD

CROSS REFERENCE TO RELATED APPLICATIONS

This application is a U.S. National Phase of International Patent Application No. PCT/JP2018/004286 filed on Feb. 8, 2018, which claims priority benefit of Japanese Patent Application No. JP 2017-029834 filed in the Japan Patent Office on Feb. 21, 2017. Each of the above-referenced applications is hereby incorporated herein by reference in its entirety.

TECHNICAL FIELD

The present technology relates to a distance measuring device and a distance measuring method and particularly relates to a distance measuring device and a distance measuring method allowing suppression of a decrease in distance measurement accuracy resulting from low-frequency noise.

BACKGROUND ART

As a distance measuring device measuring a distance to an object (hereinafter also expressed as performing distance measurement of the object), a TOF (Time Of Flight) sensor is known (see, for example, PTL 1).

The TOF sensor emits irradiation light that is light radiated to an object, and receives reflected light corresponding to the irradiation light reflected at the object. The TOF sensor thus determines a time from emission of the irradiation light until reception of the reflected light, that is, a reflection time $\Delta t$ until the irradiation light returns after being reflected at the object. The TOF sensor then uses the reflection time $\Delta t$ and a light speed c [m/s] to calculate a distance L to the object on the basis of Equation (1).

$$L = c \times \Delta t / 2 \qquad (1)$$

CITATION LIST

Patent Literature

[PTL 1]
Japanese Patent Laid-Open No. 2016-090268

SUMMARY

Technical Problem

As described above, the TOF sensor determines the time $\Delta t$ until the irradiation light returns after being reflected at the object. As a configuration for receiving the reflected light, for example, a solid-state imaging element configured similarly to a CMOS image sensor or the like is employed. Accordingly, noise occurring in a pixel signal output by the solid-state imaging element prevents accurate determination of the time $\Delta t$ until the irradiation light returns after being reflected at the object. This reduces the accuracy of distance measurement of the object.

In view of these circumstances, an object of the present technology is to inhibit noise from occurring in the pixel signal based on the reflected light from the object to allow the accuracy of distance measurement to be maintained.

Solution to Problem

A distance measuring device according to an aspect of the present technology includes a light receiving section emitting irradiation light, a light receiving section including a plurality of pixels and receiving reflected light corresponding to the irradiation light reflected at an object, a calculation section calculating a distance to the object on the basis of a time from emission of the irradiation light until reception of the reflected light, and a control section controlling emission of the irradiation light. The light receiving section includes a plurality of AD converting sections AD-converting pixel signals read from the pixels. A first pixel signal and a second pixel signal respectively read from a first pixel and a second pixel of the plurality of pixels forming the light receiving section are AD-converted by an identical AD converting section of the plurality of AD converting sections, the first pixel and the second pixel being adjacent to each other. During a process of calculating the time from emission of the irradiation light until reception of the reflected light, the calculation section calculates a difference between the first pixel signal and the second pixel signal AD-converted by the identical AD converting section.

A first pixel signal and a second pixel signal respectively read from a first pixel and a second pixel of the plurality of pixels forming the light receiving section can be AD-converted by the identical AD converting section, the first pixel and second pixel being adjacent to each other in an identical row or an identical column.

The AD converting section can AD-covert the first pixel signal read from the first pixel and then AD-convert the second pixel signal read from the second pixel.

The AD converting section can execute auto zero processing when AD-converting the first pixel signal read from the first pixel and omit the auto zero processing when AD-converting the second pixel signal read from the second pixel.

The distance measuring device according to an aspect of the present technology can be mounted in a vehicle, and the light emitting section can emit irradiation light to an outside of the vehicle.

A distance measuring method according to an aspect of the present technology is a distance measuring method for a distance measuring device. The distance measuring device includes a light emitting section emitting irradiation light, a light receiving section including a plurality of pixels and receiving reflected light corresponding to the irradiation light reflected at an object, a calculation section calculating a distance to the object on the basis of a time from emission of the irradiation light until reception of the reflected light, and a control section controlling emission of the irradiation light. The light receiving section includes a plurality of AD converting section AD-converting pixel signals read from the pixels. The distance measuring method includes the steps of AD-converting, by an identical AD converting section of the plurality of AD converting sections, a first pixel signal and a second pixel signal respectively read from a first pixel and a second pixel of the plurality of pixels forming the light receiving section, the first pixel and the second pixel being adjacent to each other, and during a process of calculating the time from emission of the irradiation light until reception of the reflected light, calculating a difference between the first pixel signal and the second pixel signal AD-converted by the identical AD converting section.

According to an aspect of the present technology, the identical AD converting section is used to AD-convert the first and second pixel signals respectively read from the first and second pixels of the plurality of pixels forming the light receiving section, the first and second pixels being adjacent to each other, and during the process of calculating the time from emission of the irradiation light until reception of the reflected light, the difference between the first pixel signal and the second pixel signal AD-converted by the identical AD converting section is calculated.

Advantageous Effects of Invention

According to an aspect of the present technology, noise can be inhibited from occurring in a pixel signal based on reflected light from an object. Accordingly, the accuracy of distance measurement can be maintained.

BRIEF DESCRIPTION OF DRAWINGS

FIG. 3 is a diagram of assistance in explaining a principle of a second calculation method for the reflection time $\Delta t$.

FIGS. 11A and 11B are timing chart of assistance in explaining operation of the column ADCs for two rows, the timing chart corresponding to FIG. 10.

FIGS. 12A and 12B are diagrams for a comparison between noise resulting from employment of the wiring layout in FIG. 8 and noise resulting from employment of the wiring layout in FIG. 10.

DESCRIPTION OF EMBODIMENT

The best mode (hereinafter referred to as the embodiment) for carrying out the present technology will be described below in detail with reference to the drawings.

Figure 1:
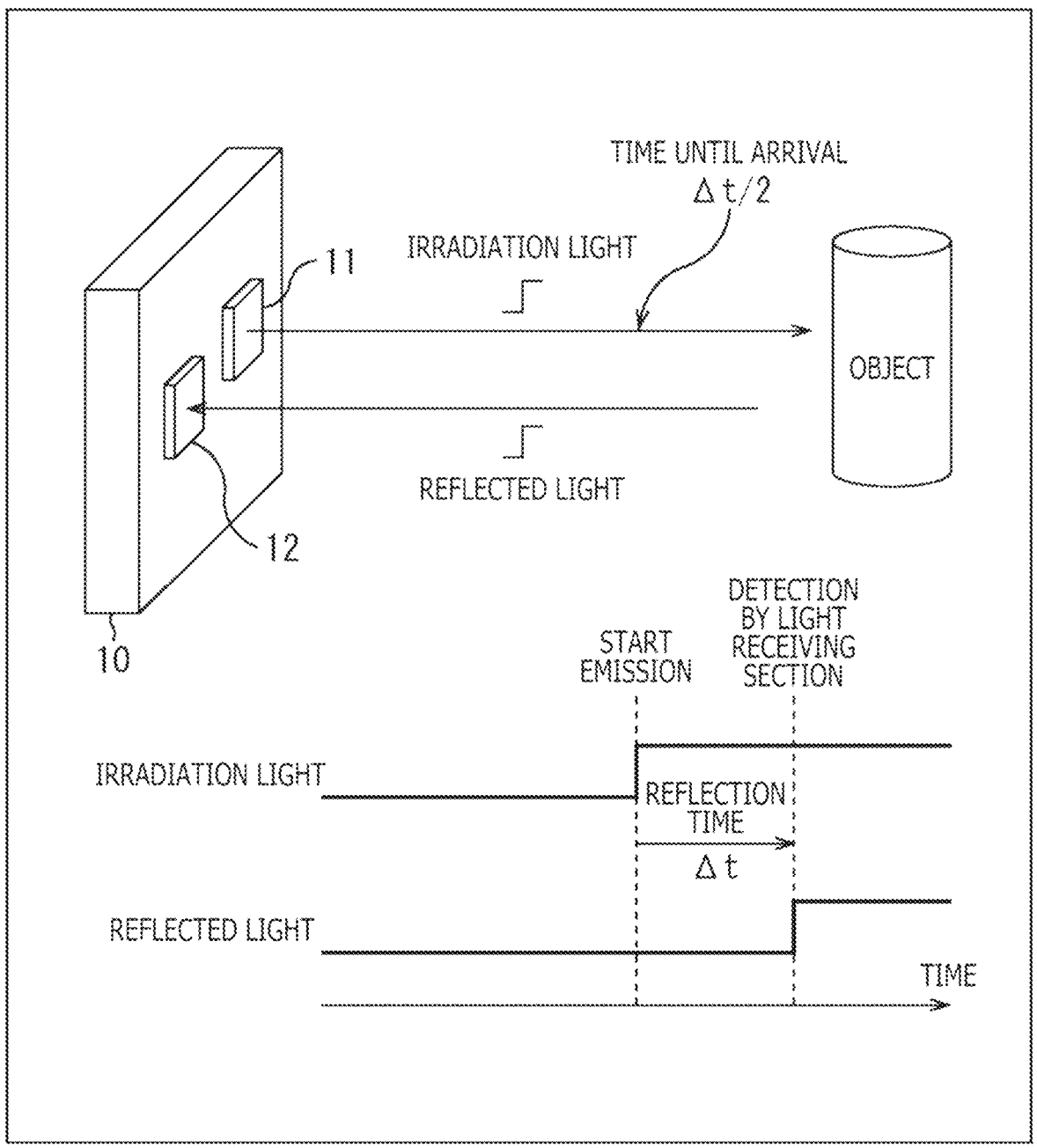
FIG. 1 is a diagram of assistance in outlining an embodiment of a distance measuring device to which the present technology is applied.

Embodiment of Distance Measuring Device to which Present Technology is Applied FIG. 1 is a diagram of assistance in outlining an embodiment of a distance measuring device to which the present technology is applied.

A distance measuring device 10 includes a light emitting section 11 and a light receiving section 12 to measure a distance to an object by a TOF method.

The light emitting section 11 emits irradiation light that is, for example, predetermined modulated light such as pulsed light radiated to the object.

The light receiving section 12 receives reflected light corresponding to the irradiation light reflected at the object.

The distance measuring device 10 determines a time (hereinafter referred to as a reflection time) $\Delta t$ from emission of the irradiation light from the light emitting section 11 until reception of the reflected light by the light receiving section 12. The distance measuring device 10 thus calculates a distance L to the object on the basis of Equation (1) described above.

Accordingly, the distance L to the object can be obtained by determining the reflection time $\Delta t$. Methods for determining the reflection time $\Delta t$ in a TOF sensor including the distance measuring device 10 include, for example, a first calculation method and a second calculation method.

First Calculation Method for Reflection Time $\Delta t$

Figure 2A:
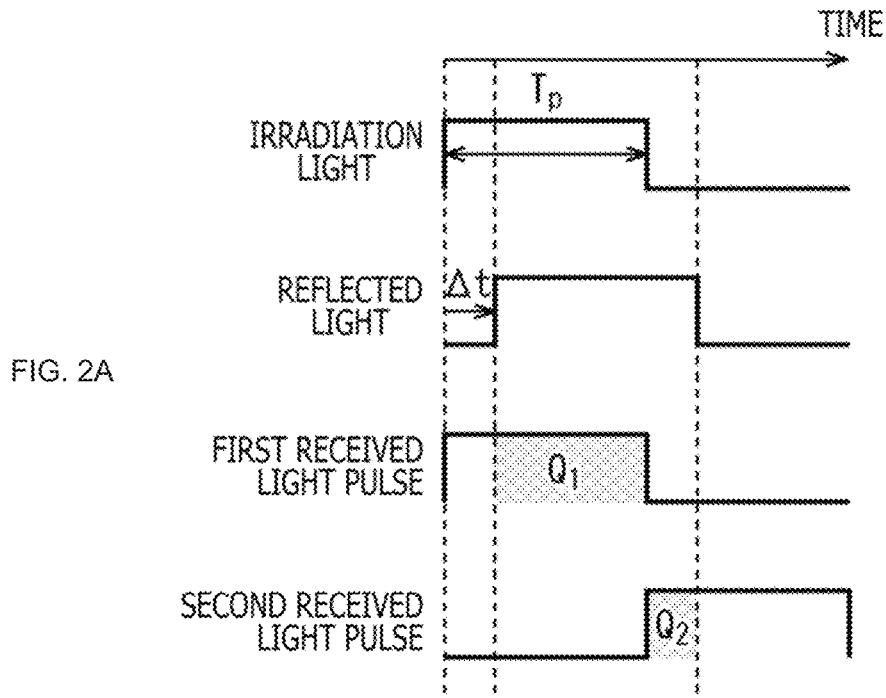
FIGS. 2A and 2B are diagrams of assistance in explaining a principle of a first calculation method for a reflection time $\Delta t$.
Figure 2B:
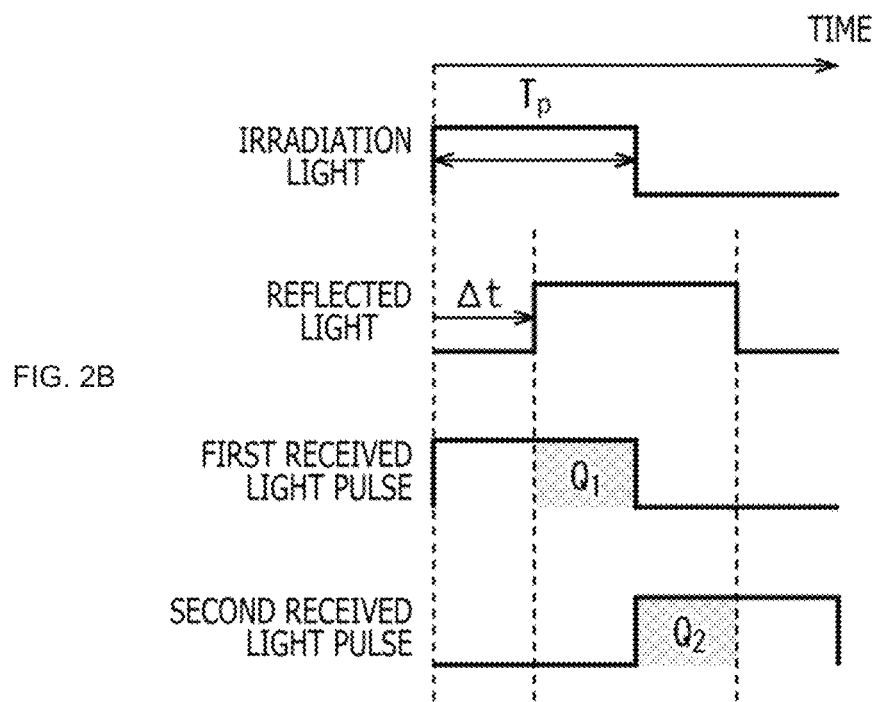

FIGS. 2A and 2B are diagrams of assistance in explaining a principle of the first calculation method for the reflection time $\Delta t$.

Here, for example, pulsed light with a predetermined pulse width Tp is assumed to be employed as irradiation light.

The TOF sensor receives the reflected light (irradiation light reflected at the object) of the irradiation light when the reflection time $\Delta t$ corresponding to the distance L to the object has elapsed since emission of the irradiation light.

Now, a pulse having the same pulse width as that of pulsed light used as irradiation light and a phase equal to the phase of the pulsed light is referred to as a first received light pulse. In addition, a pulse having the same pulse width as that of pulsed light used as irradiation light and a phase shifted from the phase of the pulsed light by a width equal to the pulse width Tp of the pulsed light is referred to as a second received light pulse.

In the first calculation method, the reflected light is received during each of a period of the first received light pulse (H (High) level) and a period of the second received light pulse.

Now, the amount of charge in the reflected light (amount of received light) received during the period of the first received light pulse is denoted as Q1. The amount of charge in the reflected light received during the period of the second received light pulse is denoted as Q2.

In this case, the reflection time $\Delta t$ can be determined in accordance with Equation (2).

$$\Delta t = Tp \times Q2/(Q1+Q2) \quad (2)$$

As can be seen from Equation (2), the reflection time $\Delta t$ is proportional to the amount of charge Q2. Accordingly, in a case where the distance L to the object is short, the amount of charge Q2 is small. In a case where the distance L to the object is long, the amount of charge Q2 is large.

FIG. 2A indicates the irradiation light, the reflected light, the amount of charge Q1 in the first received light pulse, and the amount of charge Q2 in the second received light pulse in the case where the distance L to the object is short. FIG. 2B indicates the irradiation light, the reflected light, the amount of charge Q1 in the first received light pulse, and the amount of charge Q2 in the second received light pulse in the case where the distance L to the object is long. pulse, and the amount of charge Q2 in the second received light pulse in the case where the distance L to the object is short. B in FIG. 2 indicates the irradiation light, the reflected light, the amount of charge Q1 in the first received light pulse, and the amount of charge Q2 in the second received light pulse in the case where the distance L to the object is long.

In actuality, during the period of the first and second received light pulses, ambient light is received in addition to the reflected light. Thus, in calculation of the reflection time Δt (and thus the distance L), the amount of charge in the ambient light needs to be cancelled. However, in the present embodiment, for simplification of description, description of cancellation of the amount of charge in the ambient light is omitted.

Second Calculation Method for Reflection Time Δt

FIG. 3 is a diagram of assistance in explaining a principle of the second calculation method for the reflection time Δt.

In the second calculation method, the pulsed light used as the irradiation light is emitted a plurality of times, for example, four times.

For the four emissions of the pulsed light, 0 shifted light reception, π/2 shifted light reception, n shifted light reception, and 3π/2 shifted light reception are respectively performed.

In θ shifted light reception, the reflected light is received by shifting the first and second received light pulses by θ[rad] with respect to the first and second received light pulses in the first calculation method. Here, θ[rad] indicates the phase of a pulse width Tp of the pulsed light as the irradiation light.

Now, the amount of charge in the reflected light received during the period of the first received light pulse in the θ shifted light reception is represented as TapA. The amount of charge in the reflected light received during the period of the second received light pulse in the θ shifted light reception is represented as TapB.

A difference TapA−TapB between the amounts of charge TapA and TapB obtained by the 0 shifted light reception is represented as a difference signal Sig1.

Similarly, differences TapA−TapB between the amounts of charge TapA and TapB obtained by the π/2 shifted light reception, the π shifted light reception, and the 3π/2 shifted light reception are respectively represented as a difference signals Sig2, Sig3, and Sig4.

In this case, a phase difference φ between the irradiation light and the reflected light can be determined in accordance with Equation (3).

$$\varphi = \arctan((Sig2 \times Sig4)/(Sig1 \times Sig3)) \quad (3)$$

Further, the phase difference φ corresponds to the reflection time Δt on a one-to-one basis, and the reflection time Δt can be determined on the basis of the phase difference φ in accordance with Equation (4).

$$\Delta t = Tp \times \varphi/\pi \quad (4)$$

The present technology is applicable to both the above-described first and second calculation methods. Of the first and second calculation methods, the second calculation method will be described below by way of example.

Example of Distance Measurement

Figure 4:
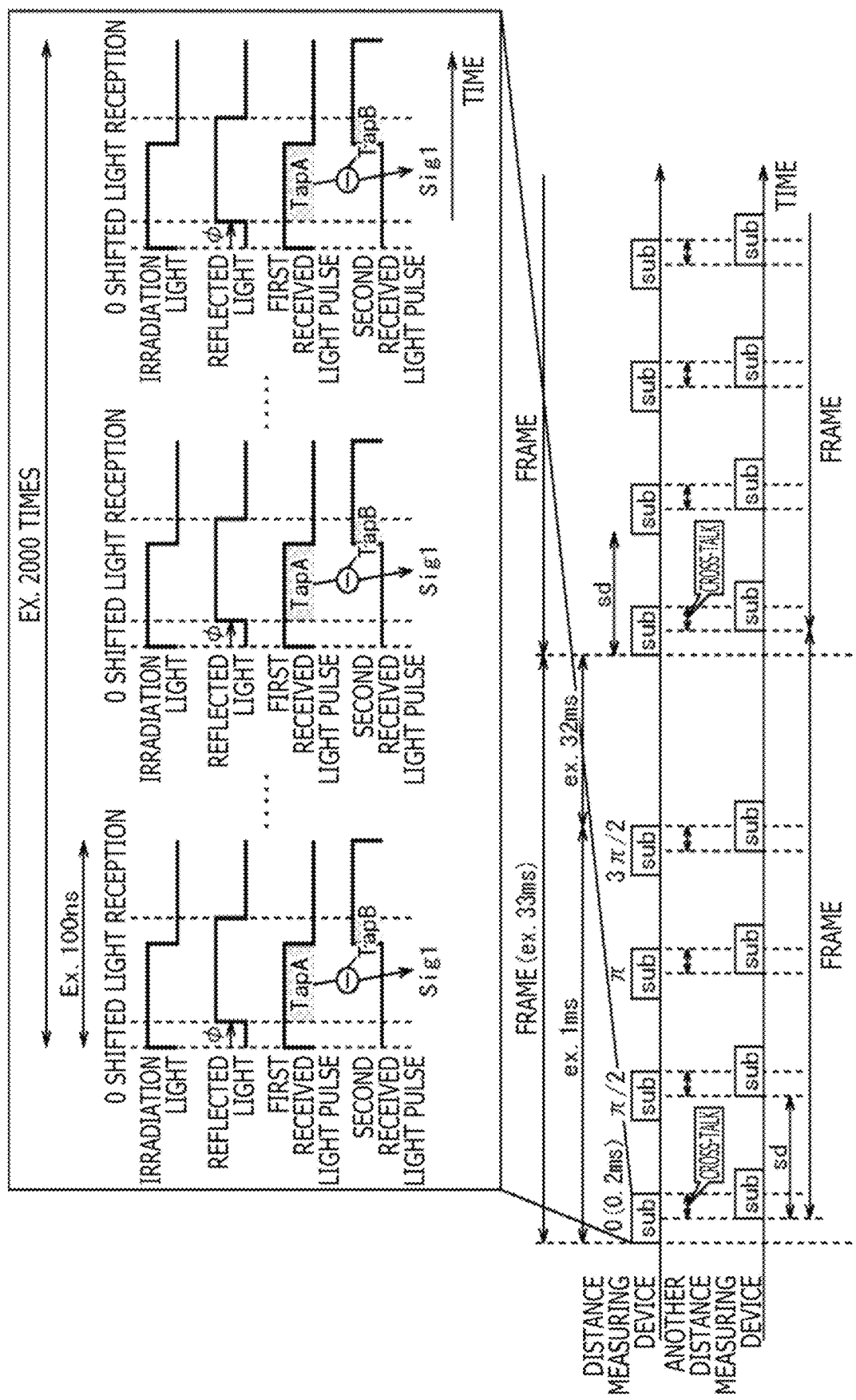
FIG. 4 is a timing chart of assistance in explaining an example of distance measurement in a case where a distance measuring device that is a TOF sensor determines the reflection time $\Delta t$ using the second calculation method.

FIG. 4 is a timing chart of assistance in explaining an example of distance measurement in a case where the distance measuring device 10, which is a TOF sensor, determines the reflection time Δt using the second calculation method.

In the distance measuring device 10, a period during which the distance L to the object is calculated is designated as a frame, and the distance L is calculated in units of frames. In FIG. 4, the frame has a length (frame length) of, for example, 33 [ms].

The frame includes a plurality of subframes sub that is a period during which the irradiation light is emitted.

In FIG. 4, the subframe has a length (subframe length) of, for example, 0.2 [ms].

Further, in FIG. 4, for example, the frame includes four subframes sub, and the four subframes sub are arranged at predetermined regular intervals sd from the head of the frame. The length from head to tail of the four subframes sub is, for example, 1 [ms]. Accordingly, in the frame in FIG. 4, the four subframes sub are present during the period of 1 [ms] from the head, with no subframes present during the remaining period of 32 (=33×1) [ms].

In the frame, the 0 shifted light reception, the π/2 shifted light reception, the n shifted light reception, and the 3π/2 shifted light reception are performed in the four respective subframes sub.

In the subframe sub, the time for one operation including emission of the irradiation light and θ shifted light reception (for example, the time corresponding to a 2π phase) is, for example, 100 [ns], and is repeated a plurality of times, for example, 2000 times.

For calculation of the phase difference φ between the irradiation light and the reflected light described in FIG. 3, the sum of the amount of charge in the reflected light received a plurality of times such as 2000 times.

Example of Configuration of Distance Measuring Device 10

Figure 5:
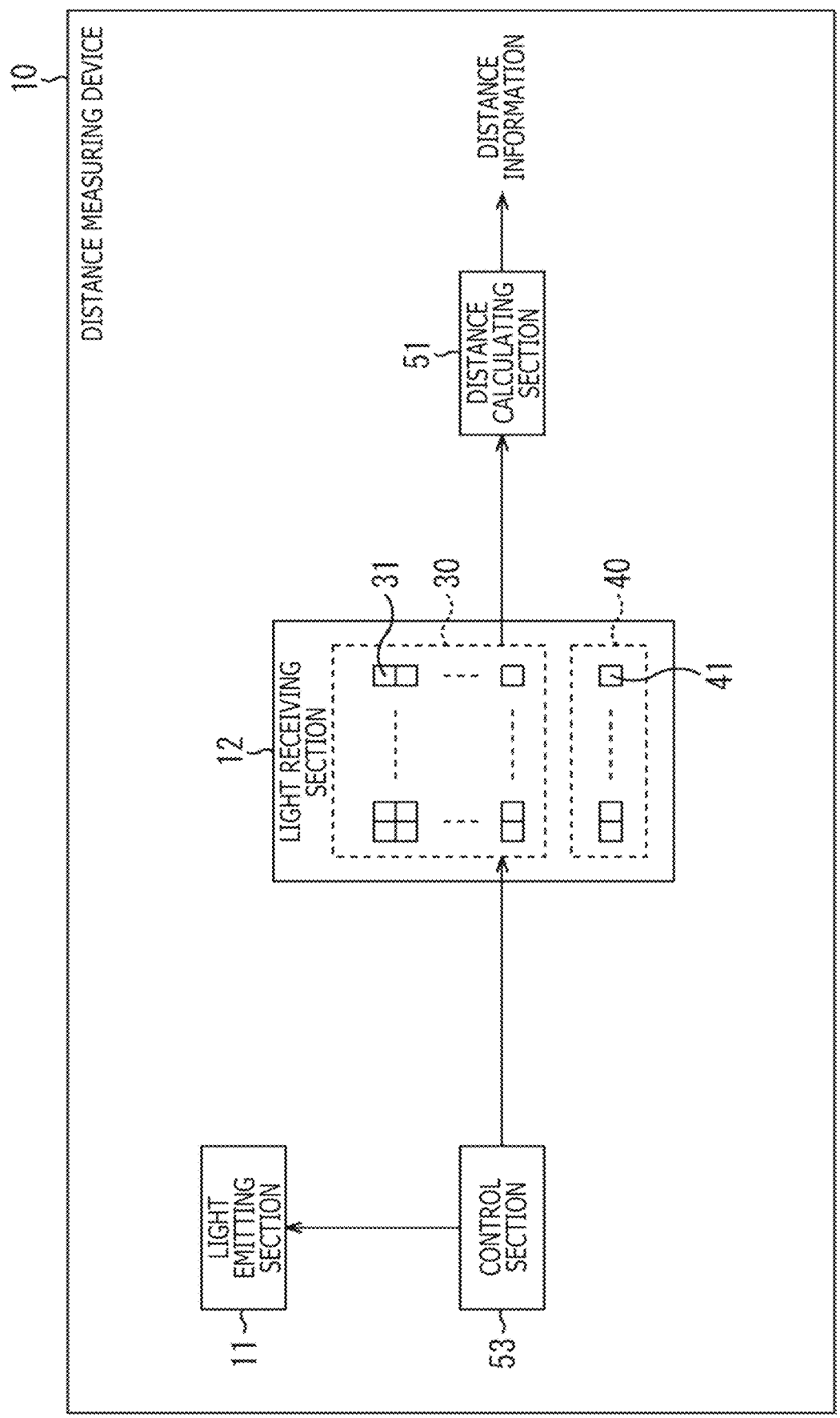
FIG. 5 is a block diagram depicting an example of electrical configuration of a distance measuring device 10.

FIG. 5 is a block diagram depicting an example of electrical configuration of the distance measuring device 10 depicted in FIG. 1.

The distance measuring device 10 includes the light emitting section 11, the light receiving section 12, a distance calculating section 51, and a control section 53.

The light emitting section 11 includes, for example, an LED (Light Emitting Diode) to emit irradiation light under the control of the control section 53.

The light receiving section 12 includes an effective pixel section 30 and a dummy pixel section 40. An example of configuration of the light receiving section 12 will be described below in detail with reference to FIG. 6.

The effective pixel section 30 includes a plurality of pixels 31, and the dummy pixel section 40 includes a plurality of pixels 41.

The pixels 31 and 41 each include, for example, a PD (photo diode), and receives light incident on the PD to generate charge corresponding to the amount of the received light.

In the effective pixel section 30, the pixels 31 receive, under the control of the control section 53, reflected light of irradiation light emitted by the light emitting section 11 to generate charge corresponding to the reflected light, that is, for example, the amount of charge TapA in the reflected light received during the period of the first received light pulse and the amount of charge TapB in the reflected light received during the period of the second received light pulse as described in FIG. 3. The pixels 31 then supply the amounts of charge TapA and TapB to the distance calculating section 51.

In the dummy pixel section 40, the pixels 41 are, for example, shielded from light, and function as what is called OPB (Optical Black) pixels.

In the configuration example depicted in FIG. 5, to avoid complexity of illustration, the pixels 31 constituting the effective pixel section 30 and the pixels 41 constituting the dummy pixel section 40 are arranged in separate areas. However, the pixels 41 can be arranged to be mixed in the pixels 31, for example.

The distance calculating section 51 uses the amount of charge from the pixels 31 to calculate the phase difference φ, for example, as described in FIG. 3, and on the basis of the reflection time Δt determined from the phase difference φ, calculates the distance L to the object. The distance calculating section 51 calculates the distance L for each of the pixels 31 constituting the effective pixel section 30. The distance calculating section 51 then outputs, as distance information, for example, a distance image having a pixel value indicative of the distance L (value corresponding to the distance L).

The control section 53 controls emission of the irradiation light by the light emitting section 11 and reception of the reflected light by the pixels 31 of the light receiving section 12.

Example of Configuration of Light Receiving Section 12

Figure 6:
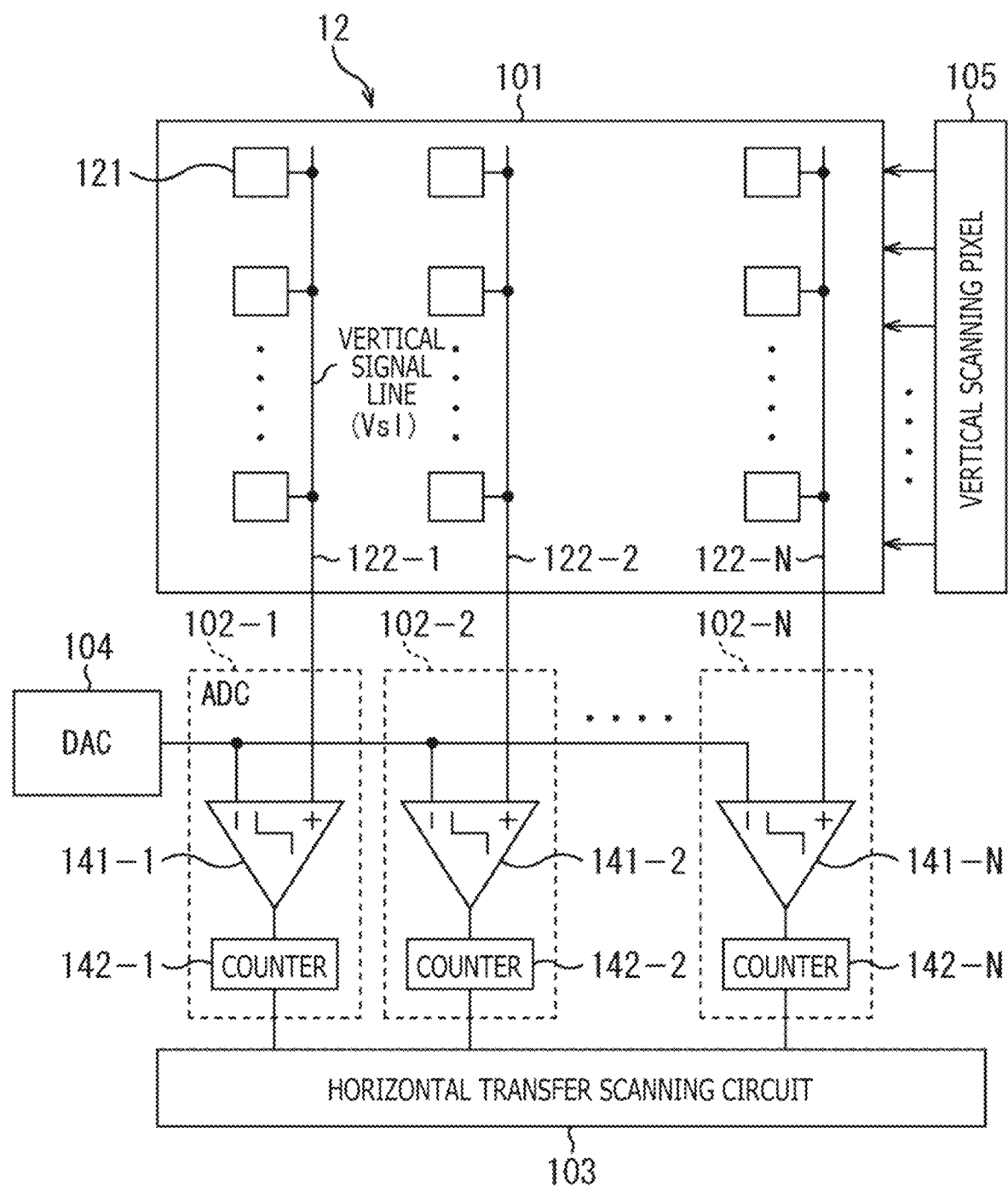
FIG. 6 is a block diagram depicting an example of configuration of a light receiving section 12.

FIG. 6 is a block diagram depicting an example of configuration of the light receiving section 12.

As depicted in FIG. 6, the light receiving section 12 is configured substantially similarly to a solid-state imaging element such as a CMOS image sensor for which a column parallel ADC (Analog Digital Converter) is employed.

The light receiving section 12 includes a pixel section 101, a column ADC 102, a horizontal transfer scanning circuit 103, a digital-analog converting (DAC) device 104, and a vertical scanning circuit 105.

The pixel section 101 corresponds to the effective pixel section 30 and the dummy pixel section 40 in FIG. 5, and includes unit pixels 121 arranged in a matrix and including PDs and various pixel Trs. (transistors). The unit pixels 121 correspond to the pixels 31 and 41 in FIG. 5.

In addition, the pixel section 101 includes pixel driving lines (not depicted) formed in the respective rows of the matrix-shaped pixel array along a lateral direction of the figure (array direction of the pixels in the pixel rows), and vertical signal lines 122-1 to 122-N formed in the respective columns along an up-down direction of the figure (array direction of the pixels in the pixel columns). In the description below, in a case where the vertical signal lines 122-1 to 122-N need not be individually distinguished from one another, the vertical signal lines 122-1 to 122-N are simply described as the vertical signal lines 122. Other sections are similarly described.

The vertical scanning circuit 105 is a pixel driving section simultaneously driving all the pixels 121 of the pixel section 101 or driving the pixels 121 in units of rows or the like, under the control of the control section 53. Although illustration of a specific configuration is omitted, the vertical scanning circuit 105 includes a read scanning system and a sweep scanning system or includes batch sweep and batch transfer.

Pixel signals output from the unit pixels 121 in a pixel row selected and scanned by the vertical scanning circuit 105 are supplied to the column ADCs 102-1 to 102-N via the vertical signal lines 122-1 to 122-N, respectively. Each of the column ADCs 102 includes a comparator 141 and a counter 142 to execute, for each pixel column of the pixel section 101, predetermined signal processing on a voltage signal VSL serving as a pixel signal output from each unit pixel 121 in the selected row through the vertical signal line 122 and to supply to the horizontal transfer scanning circuit 103.

Now, signal processing in the column ADC 102 will be described. The column ADC 102 is required to perform fast operation and thus detects only a so-called D phase level and not a P phase level. Accordingly, the column ADC 102 does not perform CDS (correlated double sampling) that is executed in column ADCs in a general CMOS image sensor and that involves outputting a difference between the D phase level and the P phase level. The CDS process has a noise elimination effect.

Figure 7:
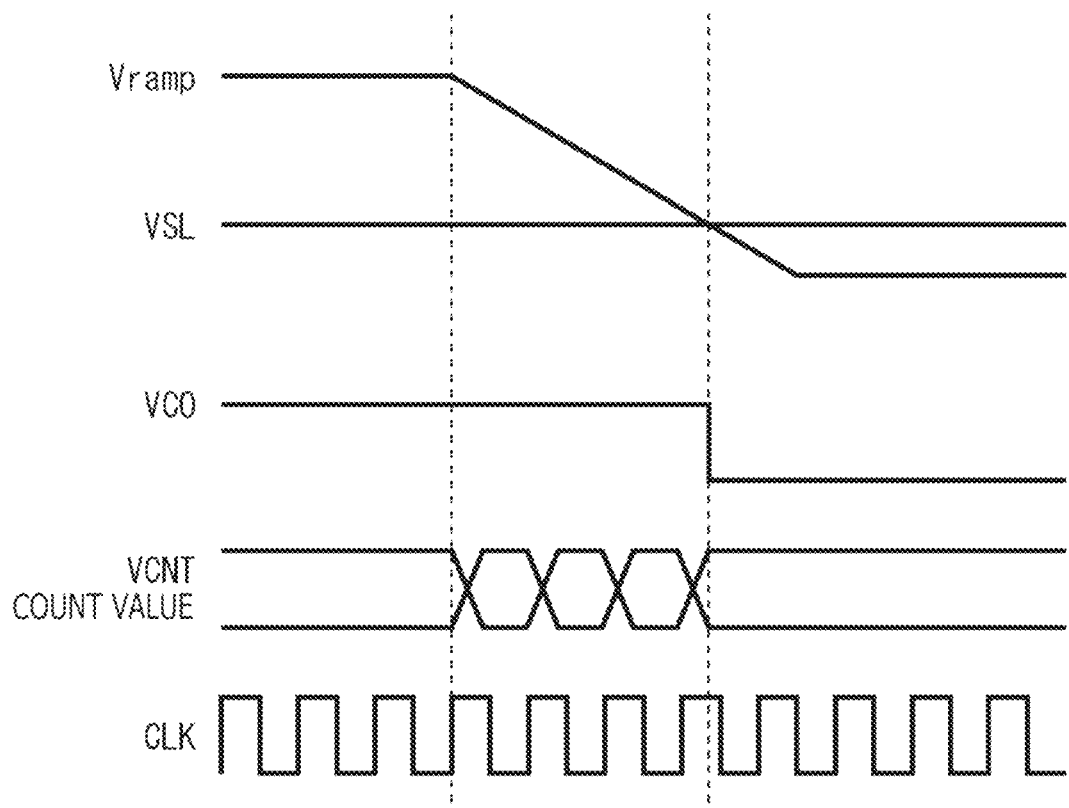
FIG. 7 is a timing chart of assistance in explaining operation of a column ADC.

FIG. 7 is a timing chart of assistance in explaining signal processing in the column ADC 102.

In the column ADC 102, the comparator 141 starts sweeping a reference voltage Vramp supplied from a DAC 104, and at the same time, the counter 142 starts a count operation. At a timing when the reference voltage Vramp becomes lower than the voltage signal VSL, an output signal VCO from the comparator 141 is inverted from high level to low level. At this rising edge, the count operation of the counter 142 is stopped. A count value VCNT has a one-to-one relationship with a voltage width over which the reference voltage Vramp has been swept, and is supplied to the succeeding horizontal transfer scanning circuit 103 as a result of an AD conversion of an input voltage.

FIG. 6 is referred to again. The horizontal transfer scanning circuit 103 sequentially selects from unit circuits corresponding to pixel columns for the column ADCs 102-1 to 102-N. The selective scan by the horizontal transfer scanning circuit 103 causes pixel signals signal-processed by the column ADCs 102 to be sequentially output to the distance calculating section 51.

Noise in Column ADCs 102

As described above, the distance calculating section 51, which succeeds the column ADCs 102, calculates the difference TapA−TapB between the amount of charges TapA and TapB, the difference resulting from the θ (=0, π/2, π, 3π/2) shifted light reception. The pixel generating the amount of charge TapA and the pixel generating the amount of charge TapB are normally arranged adjacent to each other in the same row or the same column. The pixel generating the amount of charge TapA is hereinafter referred to as the pixel A, and the pixel generating the amount of charge TapB is hereinafter referred to as the pixel B. A case will be described below in which the pixel generating the amount of charge TapA and the pixel generating the amount of charge TapB are arranged adjacent to each other in the same row by way of example.

Figure 8:
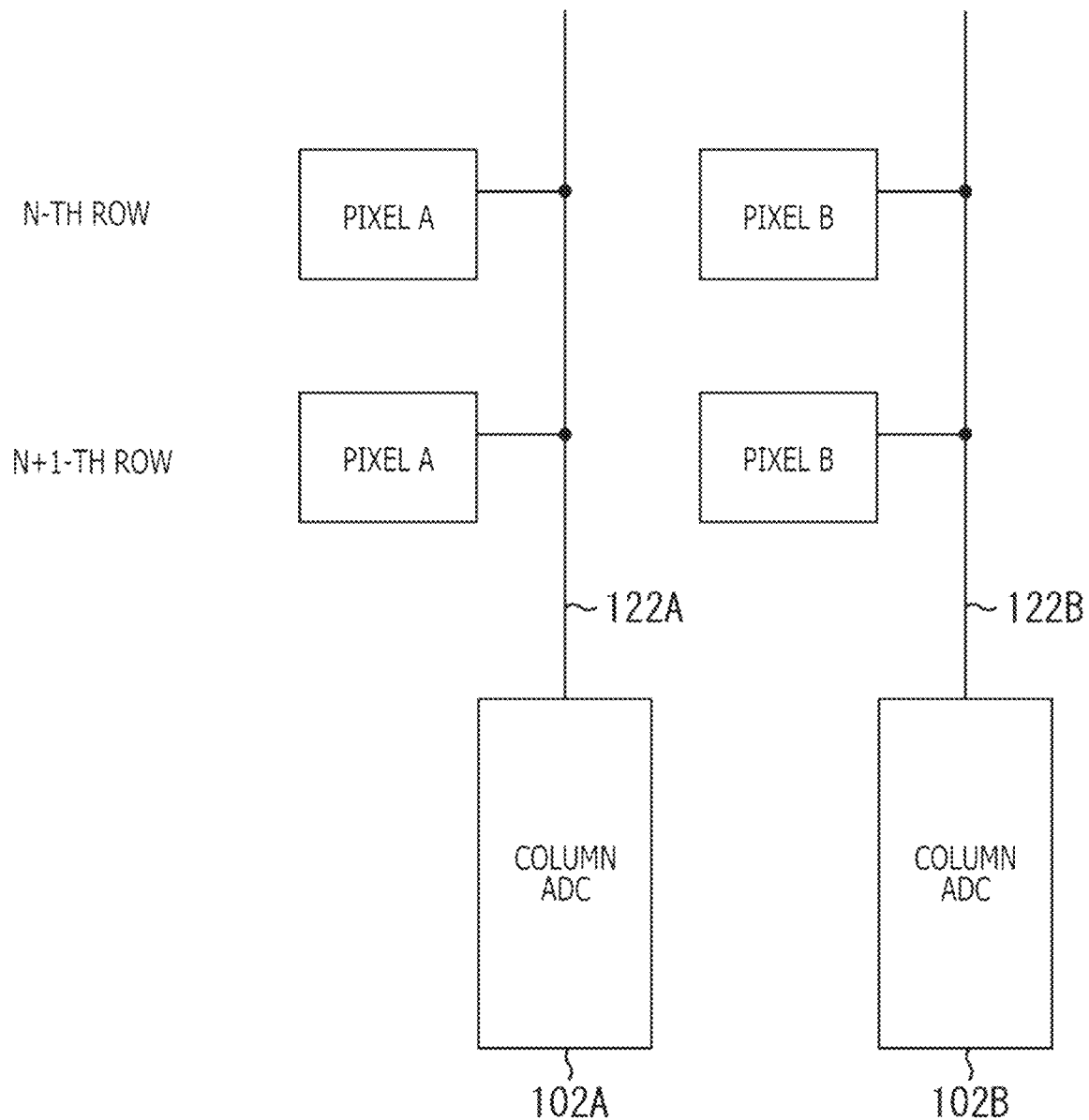
FIG. 8 is a block diagram depicting an example of a wiring layout of pixels A and B and column ADCs for two rows.

FIG. 8 is a block diagram depicting an example of a wiring layout of the pixels A and B for two rows arranged adjacent to each other, vertical signal lines 122A and 122B for two columns arranged adjacent to each other, and column ADCs 102A and 102B for the two columns arranged adjacent to each other, the pixels A and B, the vertical signal lines 122A and 122B, and the column ADCs 102A and 102B being included in the pixel section 101 of FIG. 6.

In the wiring layout depicted in FIG. 8, the pixel A in the N-th row and the pixel A in the N+1-th row are connected to the column ADC 102A via the vertical signal line 122A. Similarly, the pixel B in the N-th row and the pixel B in the N+1-th row are connected to the column ADC 102B via the vertical signal line 122B. In other words, the different column ADCs 102 connect to the pixel A outputting the amount of charge TapA, involved in the difference TapA−TapB, and the pixel B outputting the amount of charge TapB, also involved in the difference TapA−TapB.

Accordingly, in a case where the difference TapA–TapB is calculated from outputs from the pixels A and B in the N-th row, it is sufficient that the column ADC 102A and the column ADC 102B simultaneously perform one operation (first operation). Then, in a case where the difference TapA–TapB is calculated from outputs from the pixels A and B in the N+1-th row, it is sufficient that the column ADC 102A and the column ADC 102B simultaneously perform one operation (second operation).

Figure 9:
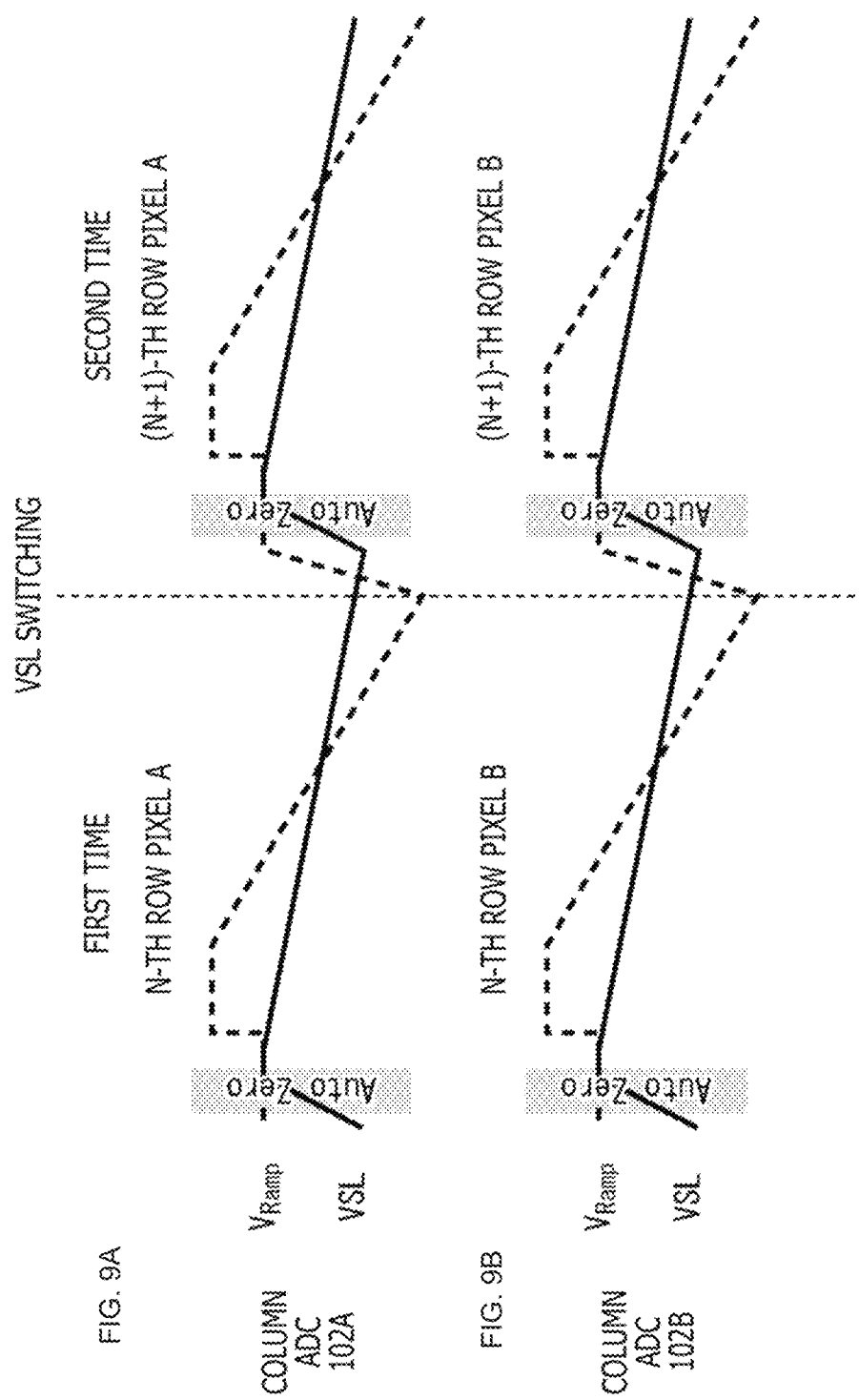
FIGS. 9A and 9B are timing chart of assistance in explaining operation of the column ADCs for two rows, the timing chart corresponding to FIG. 8.

FIGS. 9A and 9B are timing chart representing the operation of the column ADCs 102A and 102B in the wiring layout depicted in FIG. 8. FIG. 9A depicts the operation of the column ADC 102A, and FIG. 9B depicts the operation of the column ADC 102B.

In the wiring layout depicted in FIG. 8, as depicted in FIGS. 9A and 9B, the column ADCs 102A and 102B execute, at the start of each operation, auto zero processing of offsetting the voltage signal VSL.

In a case where the difference TapA–TapB is calculated from outputs from the pixels A and B in one row (for example, the N-th row), it is sufficient that the column ADC 102A and the column ADC 102B simultaneously perform one operation (first operation). Accordingly, two operations (first operation and second operation) simultaneously performed by the column ADC 102A and the column ADC 102B allow the difference TapA–TapB to be calculated from outputs from the pixels A and B for two rows (for example, the N-th row and the N+1-th row).

However, the column ADC 102 does not execute a CDS process having a noise elimination effect due to a need for fast operation as described above. Accordingly, an output from the column ADC 102 remains mixed with low-frequency noise typified by 1/f noise mostly applied by the comparator 141. The output from the column ADCs 102 mixed with low-frequency noise also leads to an error in the difference TapA–TapB calculated by the succeeding distance calculating section 51. This increases an error in the finally calculated distance L to the object.

Thus, in the present embodiment, the wiring layout depicted in FIG. 8 is changed such that, once the distance calculating section 51 calculates the difference TapA–TapB, the effect of allowing low-frequency noise to be eliminated is obtained as is the case with the CDS process.

Figure 10:
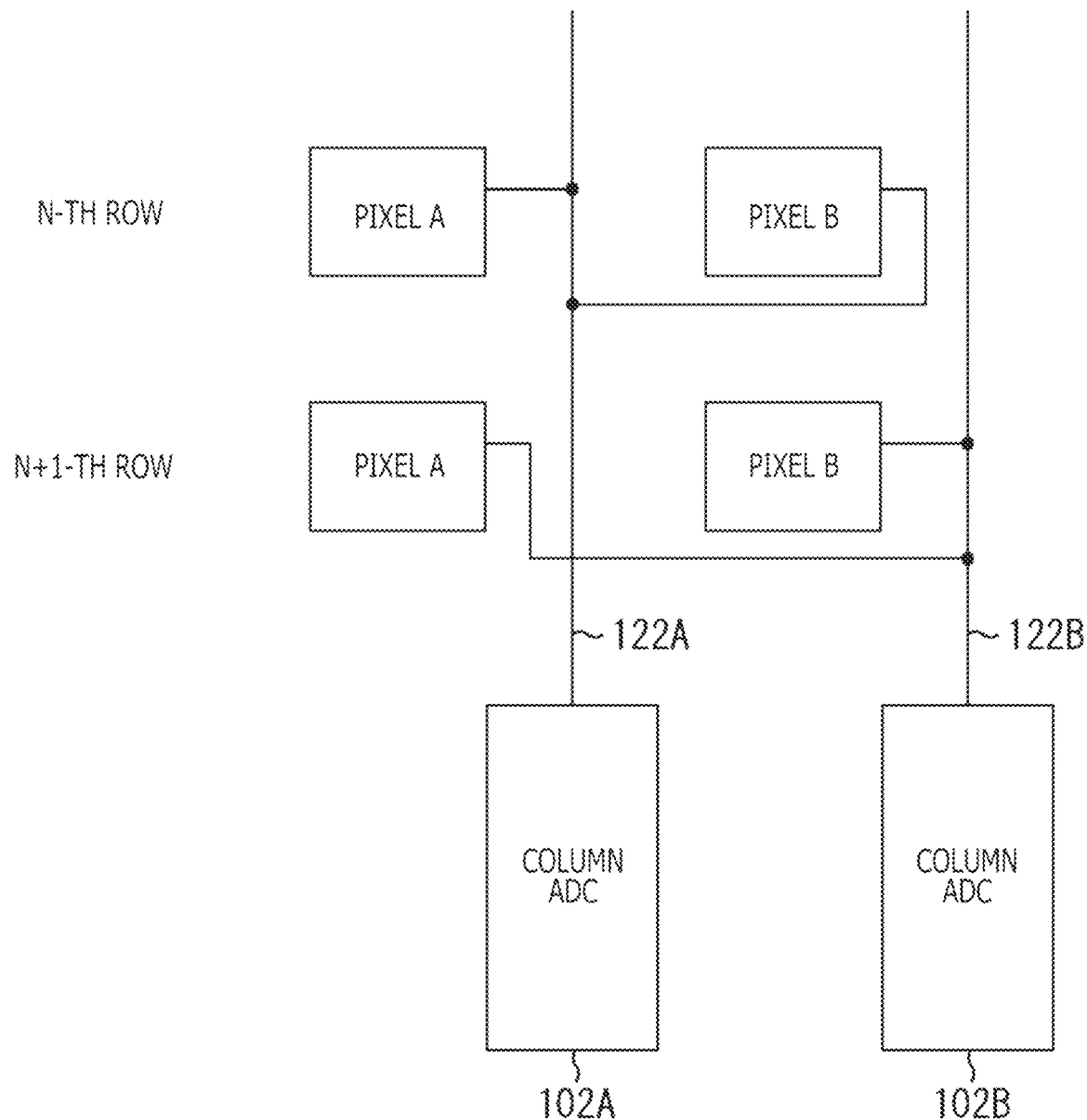
FIG. 10 is a block diagram depicting an example of a wiring layout of the pixels A and B and column ADCs for two rows according to the present embodiment.

Wiring Layout of Pixels A and B and Column ACDs 102 in Present Embodiment FIG. 10 is a block diagram depicting a wiring layout in the present embodiment of the pixels A and B for two rows arranged adjacent to each other, the vertical signal lines 122A and 122B for two columns arranged adjacent to each other, and the column ADCs 102A and 102B for the two column ADCs arranged adjacent to each other, the pixels A and B, the vertical signal lines 122A and 122B, and the column ADCs 102A and 102B being included in the pixel section 101 of FIG. 6.

In the wiring layout depicted in FIG. 10, the pixel A and the pixel B in the N-th row are connected to the column ADC 102A via the vertical signal line 122A. Similarly, the pixel A and the pixel B in the N+1-th row are connected to the column ADC 102B via the vertical signal line 122B. In other words, the same column ADC 102 connects to the pixel A outputting the amount of charge TapA, involved in the difference TapA–TapB, and the pixel B outputting the amount of charge TapB, also involved in the difference TapA–TapB.

In a case where the difference TapA–TapB is calculated from outputs from the pixels A and B in the N-th row, it is sufficient that the column ADC 102A AD-converts, as the first operation, the output from the pixel A in the N-th row and then AD-converts, as the second operation, the output from the pixel B in the N-th row.

However, when the column ADC 102A performs the first and second operations, the column ADC 102B can simultaneously perform two operations. Specifically, after AD-converting, as the first operation, an output from the pixel A in the N+1-th row, the column ADC 102B can AD-convert, as the second operation, an output from the pixel B in the N+1-th row.

FIGS. 11A and 11B are timing chart representing the operation of the column ADCs 102A and 102B in the wiring layout depicted in FIG. 10. FIG. 11A depicts the operation of the column ADC 102A, and FIG. 11B depicts the operation of the column ADC 102B.

In the wiring layout depicted in FIG. 10, the column ADCs 102A and 102B execute the auto zero processing only at the beginning of the first operation and omit the auto zero processing in the second operation as depicted in FIGS. 11A and 11B.

Then, the column ADC 102A AD-coverts, as the first operation, the output from the pixel A in the N-th row, and then AD-coverts, as the second operation, the output from the pixel B in the N-th row while omitting the auto zero processing. In addition, at the same time, the column ADC 102B AD-coverts, as the first operation, the output from the pixel A in the N+1-th row, and then AD-coverts, as the second operation, the output from the pixel B in the N+1-th row while omitting the auto zero processing.

In the wiring layout depicted in FIG. 10, the outputs from the pixels A and B in the N-th row are AD-converted by the same column ADC 102A. Similarly, the outputs from the pixels A and B in the N+1-th row are AD-converted by the same column ADC 102B. Accordingly, when the succeeding distance calculating section 51 calculates the difference TapA–TapB, the result of the calculation additionally contains a high pass filter effect (low-frequency noise elimination effect) of a high pass filter function (Equation (5) below) based on difference extraction. This allows the effect of eliminating low-frequency noise to be obtained as is the case with the CDS process.

$$\text{High pass filter function } H(\omega) = \sqrt{(2 - 2\cos(2\pi F\text{noise } T\text{cds}))} \quad (5)$$

In addition, since the outputs from the pixels A and B in the N-th row are AD-converted by the same column ADC 102A, this AD-conversion suppresses a variation in AD conversion property among columns compared to the AD-conversion, by the different column ADCs 102A and 102B, of the outputs from the pixels A and B in the N-th row as the wiring layout depicted in FIG. 8.

However, as a disadvantage of the wiring layout depicted in FIG. 10, a read time difference may occur that does not occur in the wiring layout depicted in FIG. 8, thus causing a difference attributed to disturbance (mostly an adverse effect on a PSRR (power supply rejection ratio)). However, the adverse effect on the PSRR can be suppressed by providing a power supply noise cancel circuit (DC).

<Comparison between Wiring Layout in FIG. 8 and Wiring Layout in FIG. 10>

FIGS. 12A and 12B represent noise mixed in the difference TapA-TapB in the succeeding distance calculating section 51 in a case where the wiring layout in FIG. 8 is employed and in a case where the wiring layout in FIG. 10 is employed.

FIG. 12A corresponds to the wiring layout in FIG. 8, and FIG. 12B corresponds to the wiring layout in FIG. 10. Compared to the wiring layout in FIG. 8, the wiring layout in FIG. 10 can reduce CM (common mode) noise down to approximately 50%. In addition, the Total noise can also be reduced by approximately 10%.

Description of Computer to Which Present Technology is Applied

The above-described series of processes can be executed by hardware or software. In a case where the series of processes is executed by software, a program constituting the software is installed in a computer. Here, examples of the computer include a computer integrated into dedicated hardware, and a computer enabled to execute various functions by installation of various programs in the computer, for example, a general-purpose personal computer.

Figure 13:
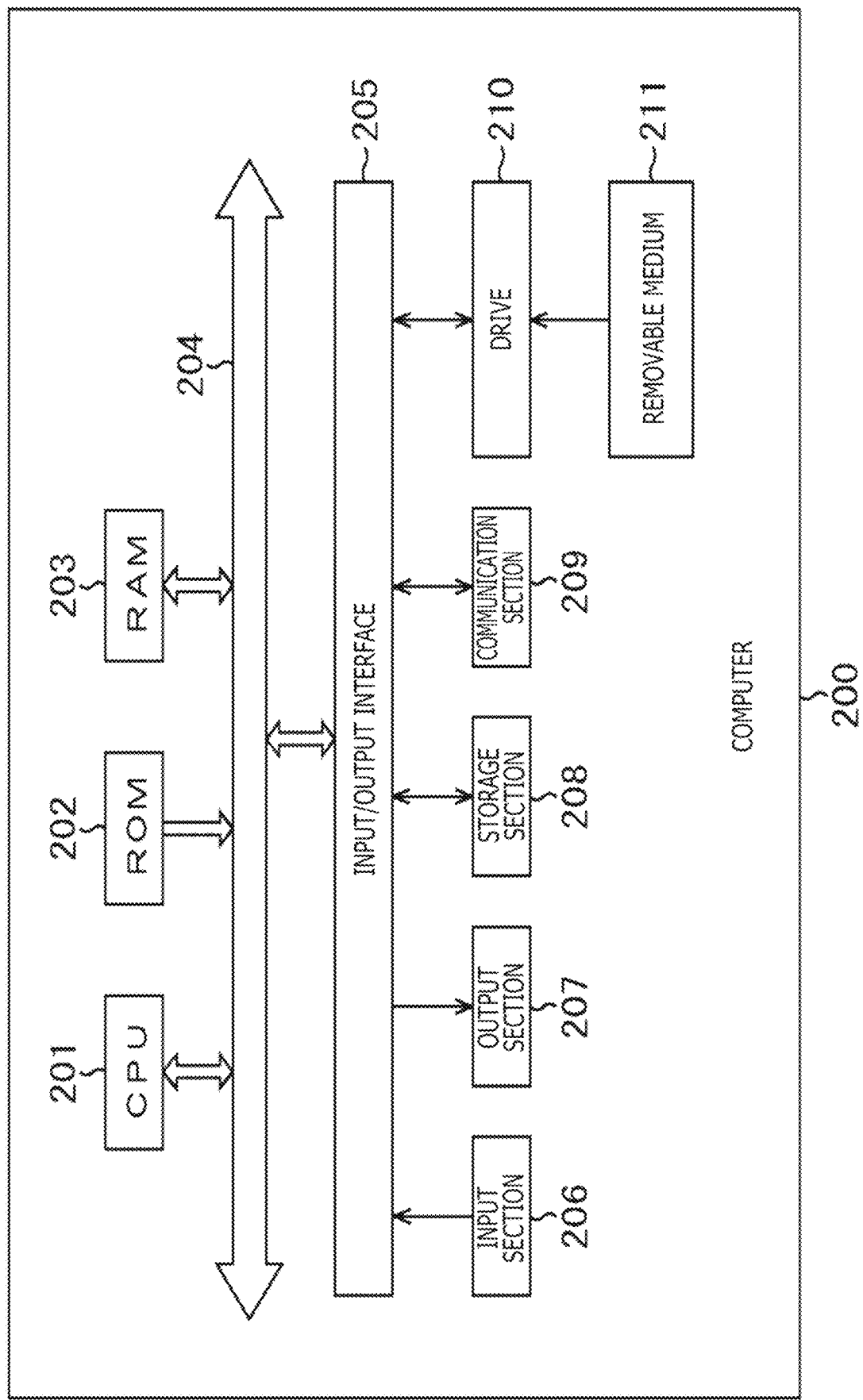

FIG. 13 is a block diagram depicting an example of configuration of hardware of a computer executing the above-described series of processes using a program.

In a computer 200, a CPU (Central Processing Unit) 201, a ROM (Read Only Memory) 202, and a RAM (Random Access Memory) 203 are connected together by a bus 204.

The bus 204 further connects to an input/output interface 205. The input/output interface 205 connects to an input section 206, an output section 207, a storage section 208, a communication section 209, and a drive 210.

The input section 206 includes a keyboard, a mouse, a microphone, and the like. The output section 207 consists of a display, a speaker, and the like. The storage section 208 includes a hard disk, a nonvolatile memory, and the like. The communication section 209 includes a network interface and the like. The drive 210 drives a removable medium 211 such as a magnetic disk, an optical disc, a magneto-optical disk, or a semiconductor memory.

The computer 200 configured as described above executes the above-described series of processes by causing the CPU 201 to, for example, load, into the RAM 203, a program stored in the storage section 208 via the input/output interface 205 and the bus 204 and executing the program.

The program executed by the computer (CPU 201) can be provided, for example, by being recorded in the removable medium 211, used as a package medium. Further, the program can also be provided via a wired or wireless transmission medium such as a local area network, the internet, and digital satellite broadcasting.

In the computer 200, the program can be installed in the storage section 208 via the input/output interface 205 by mounting the removable medium 211 into the drive 210. In addition, the program can be received by the communication section 209 via a wired or wireless transmission medium and installed in the storage section 208. Otherwise the program can be preinstalled in the ROM 202 or the storage section 208.

The program executed by the computer 200 may be a program processed in a chronological order and in the order described herein or a program processed in parallel or at needed timings, for example, when the program is invoked.

Applications to Mobile Body

The technology according to the present disclosure (the present technology) can be applied to various products. For example, the technology according to the present disclosure may be implemented as a device mounted in any type of mobile body such as an automobile, an electric vehicle, a hybrid electric vehicle, a motorcycle, a bicycle, a personal mobility, an airplane, a drone, a ship, or a robot.

Figure 14:
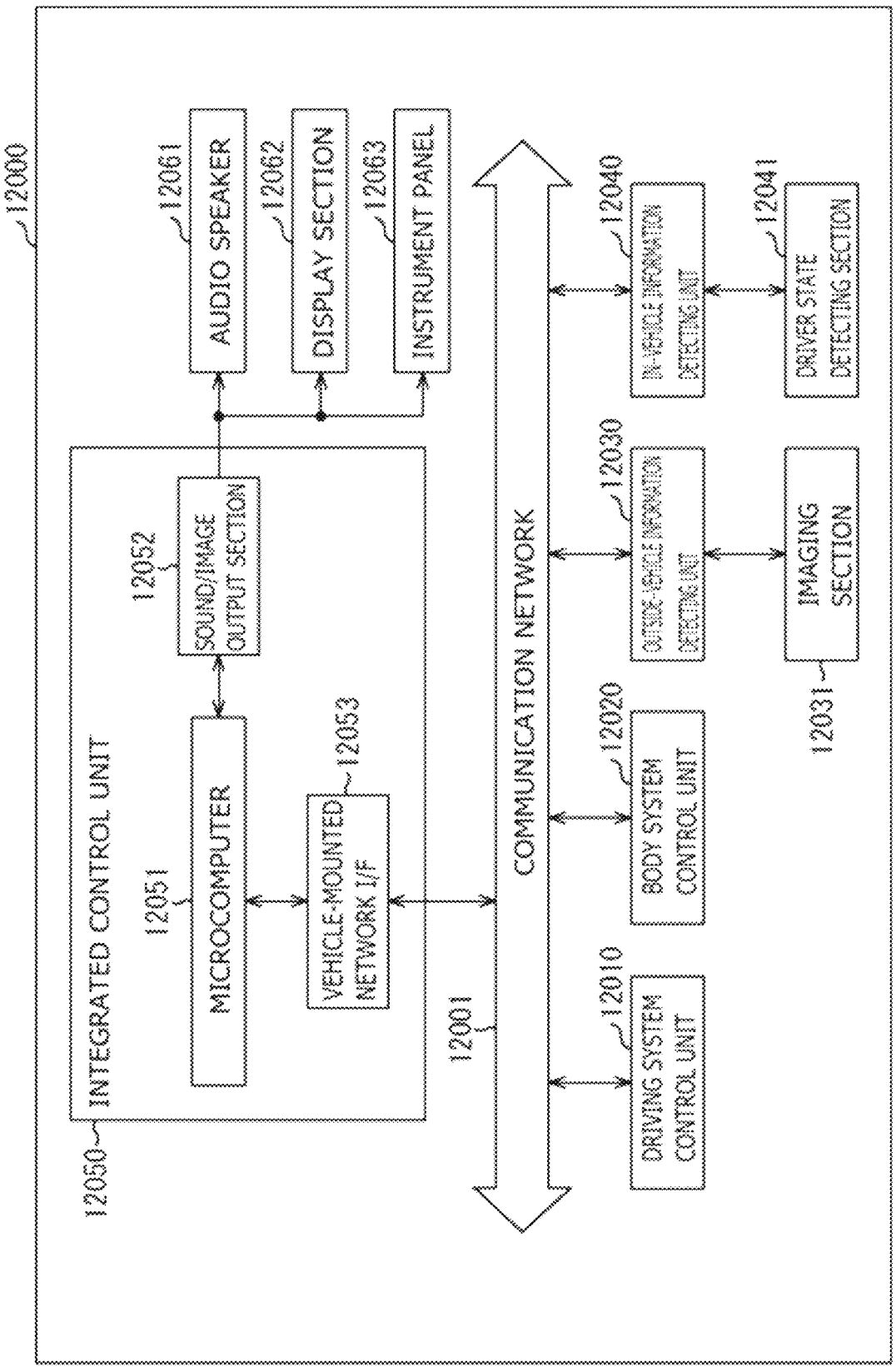

FIG. 14 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 14, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 14, an audio speaker 12061, a display section 12062, and an instrument panel 12063 are illustrated as the output device. The display section 12062 may, for example, include at least one of an on-board display and a head-up display.

Figure 15:
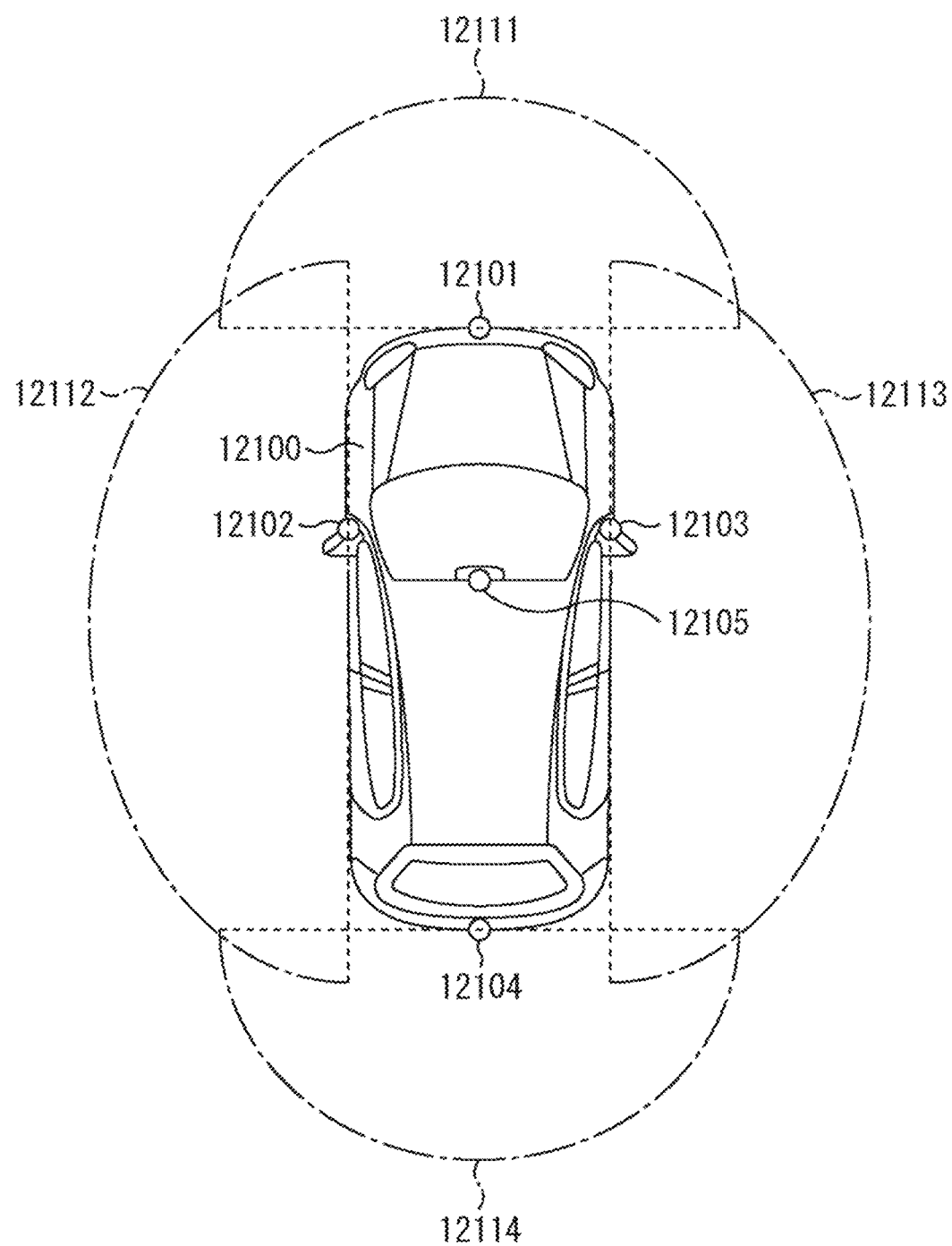

FIG. 15 is a diagram depicting an example of the installation position of the imaging section 12031.

In FIG. 15, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 15 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure may be applied has been described. The technology according to the present disclosure may be applied to, for example, the imaging section 12031, included in the above-described configuration.

The embodiment of the present technology is not limited to the above-described embodiment, and various changes can be made to the embodiment without departing from the spirits of the present technology.

The present technology can take the following configuration.

(1)

A distance measuring device including:
a light receiving section emitting irradiation light;
a light receiving section including a plurality of pixels and receiving reflected light corresponding to the irradiation light reflected at an object;
a calculation section calculating a distance to the object on the basis of a time from emission of the irradiation light until reception of the reflected light; and
a control section controlling emission of the irradiation light,
in which the light receiving section includes a plurality of AD converting sections AD-converting pixel signals read from the pixels,
a first pixel signal and a second pixel signal respectively read from a first pixel and a second pixel of the plurality of pixels forming the light receiving section are AD-converted by an identical AD converting section of the plurality of AD converting sections, the first pixel and the second pixel being adjacent to each other, and
during a process of calculating the time from emission of the irradiation light until reception of the reflected light, the calculation section calculates a difference between the first pixel signal and the second pixel signal AD-converted by the identical AD converting section.

(2)

The distance measuring device according to (1) described above, in which a first pixel signal and a second pixel signal respectively read from a first pixel and a second pixel of the plurality of pixels forming the light receiving section are AD-converted by the identical AD converting section, the first pixel and second pixel being adjacent to each other in an identical row or an identical column.

(3)

The distance measuring device according to (1) or (2) described above, in which the AD converting section AD-coverts the first pixel signal read from the first pixel and then AD-converts the second pixel signal read from the second pixel.

(4)

The distance measuring device according to any of (1) to (3) described above, in which the AD converting section executes auto zero processing when AD-converting the first pixel signal read from the first pixel and omits the auto zero processing when AD-converting the second pixel signal read from the second pixel.

(5)

The distance measuring device according to any of (1) to (4) described above, which is mounted in a vehicle, in which the light emitting section emits irradiation light to an outside of the vehicle.

(6)

A distance measuring method for a distance measuring device including
a light emitting section emitting irradiation light,
a light receiving section including a plurality of pixels and receiving reflected light corresponding to the irradiation light reflected at an object,
a calculation section calculating a distance to the object on the basis of a time from emission of the irradiation light until reception of the reflected light, and
a control section controlling emission of the irradiation light,
the light receiving section including a plurality of AD converting section AD-converting pixel signals read from the pixels,
the distance measuring method including the steps of:
AD-converting, by an identical AD converting section of the plurality of AD converting sections, a first pixel signal and a second pixel signal respectively read from a first pixel and a second pixel of the plurality of pixels forming the light receiving section, the first pixel and the second pixel being adjacent to each other; and
during a process of calculating the time from emission of the irradiation light until reception of the reflected light, calculating a difference between the first pixel signal and the second pixel signal AD-converted by the identical AD converting section.

REFERENCE SIGNS LIST

10 Distance measuring device, 11 Light emitting section, 12 Light receiving section, 30 Effective pixel section, 31 Pixel, 40 Dummy pixel section, 41 Pixel, 51 Distance calculating section, 53 Control section, 101 Pixel section, 102 Column ADC, 103 Horizontal transfer scanning circuit, 104 Digital-analog converting device, 105 Vertical scanning circuit, 122 Vertical signal line, 141 Comparator, 142 Counter, 200 Computer, 201 CPU

The invention claimed is:
1. A distance measuring device, comprising:
a light emitting section configured to emit irradiation light;
a light receiving section including a plurality of pixels and a plurality of analog digital (AD) converting sections, wherein
each of the plurality of pixels is configured to receive reflected light corresponding to the irradiation light reflected from an object, and an AD converting section of the plurality of AD converting sections is configured to:
- execute an AD conversion on a first pixel signal associated with a first pixel of the plurality of pixels; and
- execute the AD conversion on a second pixel signal associated with a second pixel of the plurality of pixels, wherein the first pixel is adjacent to the second pixel; and a calculation section configured to:
- calculate a difference between the AD-converted first pixel signal and the AD-converted second pixel signal; and
- calculate a time period from the emission of the irradiation light to the reception of the reflected light based on the difference between the AD-converted first pixel signal and the AD-converted second pixel signal.

2. The distance measuring device according to claim 1, wherein the first pixel is adjacent to the second pixel in one of a row or a column of a pixel array of the light receiving section.

3. The distance measuring device according to claim 1, wherein the AD converting section is further configured to:
- execute the AD conversion on the first pixel signal based on execution of an auto zero processing operation; and
- execute the AD conversion on the second pixel signal based on omission of the auto zero processing operation.

4. The distance measuring device according to claim 1, wherein
- the distance measuring device is mounted in a vehicle, and
- the light emitting section is further configured to emit the irradiation light to an outside of the vehicle.

5. A distance measuring method, comprising:
in a distance measuring device:
- emitting, by a light emitting section, irradiation light;
- receiving, by each of a plurality of pixels of a light receiving section, reflected light corresponding to the irradiation light reflected from an object;
- executing, by an analog digital (AD) converting section of a plurality of AD converting sections of the light receiving section, an AD conversion on a first pixel signal associated with a first pixel of the plurality of pixels;
- executing, by the AD converting section, a second pixel signal associated with a second pixel of the plurality of pixels, wherein the first pixel is adjacent to the second pixel;
- calculating a difference between the AD-converted first pixel signal and the AD-converted second pixel signal; and
- calculating a time period from the emission of the irradiation light to the reception of the reflected light based on the difference between the AD-converted first pixel signal and the AD-converted second pixel signal.

* * * * *